(12) United States Patent
Toomer et al.

(10) Patent No.: US 9,536,256 B2
(45) Date of Patent: Jan. 3, 2017

(54) SYSTEMS AND METHODS FOR STORED-VALUE EXCHANGE WITHIN SOCIAL NETWORKING ENVIRONMENTS

(75) Inventors: Christopher L. Toomer, Parker, CO (US); Steven E. Arthur, Castle Rock, CO (US); Debi Rex, Parker, CO (US); Ginger Sayor, Castle Rock, CO (US)

(73) Assignee: First Data Corporation, Greenwood Village, CO (US)

( * ) Notice: Subject to any disclaimer, the term of this patent is extended or adjusted under 35 U.S.C. 154(b) by 1858 days.

(21) Appl. No.: 11/868,831

(22) Filed: Oct. 8, 2007

(65) Prior Publication Data

US 2009/0094134 A1 Apr. 9, 2009

(51) Int. Cl.
*G06Q 30/00* (2012.01)
*G06Q 30/06* (2012.01)
*G06Q 30/02* (2012.01)
*G06Q 20/10* (2012.01)
*G06Q 10/10* (2012.01)

(52) U.S. Cl.
CPC .......... *G06Q 30/0601* (2013.01); *G06Q 10/10* (2013.01); *G06Q 20/10* (2013.01); *G06Q 30/02* (2013.01)

(58) Field of Classification Search
USPC .................................. 705/26–27, 26.1–27.2
See application file for complete search history.

(56) References Cited

U.S. PATENT DOCUMENTS

| | | | |
|---|---|---|---|
| 6,321,211 B1 | 11/2001 | Dodd | |
| 6,633,849 B1 * | 10/2003 | Dodd | 705/1 |
| 6,736,322 B2 | 5/2004 | Gobburu et al. | |
| 6,829,586 B2 | 12/2004 | Postrel | |
| 7,028,906 B2 | 4/2006 | Challa et al. | |
| 7,054,842 B2 | 5/2006 | James et al. | |
| 7,083,081 B2 | 8/2006 | McGee et al. | |
| 7,257,545 B1 | 8/2007 | Hung | |
| 7,266,533 B2 | 9/2007 | Karas et al. | |
| 7,278,570 B2 | 10/2007 | McGee et al. | |
| 7,343,335 B1 * | 3/2008 | Olliphant | 705/36 R |
| 7,353,996 B2 | 4/2008 | Goodman et al. | |
| 7,395,961 B2 | 7/2008 | Challa et al. | |
| 7,409,358 B2 | 8/2008 | Baumgartner et al. | |
| 7,412,411 B2 | 8/2008 | Horel et al. | |
| 7,493,284 B2 | 2/2009 | Celi, Jr. et al. | |
| 7,568,623 B2 | 8/2009 | Retter et al. | |

(Continued)

OTHER PUBLICATIONS

O'Murchu, Ina et al., "Online Social and Business Networking Communities", Digital Enterprise Research Institute Technical Report, Aug. 11, 2004, Aug. 2004.*

(Continued)

*Primary Examiner* — Kathleen Palavecino
(74) *Attorney, Agent, or Firm* — Kilpatrick Townsend & Stockton LLP (57) ABSTRACT

An electronic social networking environment enables the transfer of stored value between users of the environment. A transfer may be in the form of a gift from one user to another. The stored value may represent actual currency or virtual currency. The stored value may be redeemed within or outside the electronic social networking environment, and may be redeemed with one or more merchants. The stored value may be redeemed for a physical item or service or for a virtual item or service.

24 Claims, 7 Drawing Sheets

(56) References Cited

U.S. PATENT DOCUMENTS

| | | | |
|---|---|---|---|
| 7,580,864 B2 | 8/2009 | Ahu | |
| 7,597,264 B2 | 10/2009 | Newbrough et al. | |
| 7,747,536 B2 | 6/2010 | McGee et al. | |
| 2002/0077890 A1 | 6/2002 | LaPointe et al. | |
| 2002/0107783 A1* | 8/2002 | La Mura et al. | 705/37 |
| 2002/0120564 A1* | 8/2002 | Strietzel | 705/40 |
| 2002/0123924 A1* | 9/2002 | Cruz | 705/10 |
| 2003/0074265 A1* | 4/2003 | Oshima | 705/26 |
| 2003/0172004 A1* | 9/2003 | Anderson | 705/27 |
| 2003/0233283 A1* | 12/2003 | Shah | 705/26 |
| 2004/0083170 A1 | 4/2004 | Bam et al. | |
| 2004/0098326 A1 | 5/2004 | James et al. | |
| 2004/0172340 A1* | 9/2004 | Bishop et al. | 705/26 |
| 2005/0107152 A1 | 5/2005 | McGee et al. | |
| 2005/0203801 A1* | 9/2005 | Morgenstern et al. | 705/14 |
| 2005/0216377 A1 | 9/2005 | Trauberg | |
| 2006/0036503 A1* | 2/2006 | Schweier et al. | 705/26 |
| 2006/0059040 A1* | 3/2006 | Eldred et al. | 705/14 |
| 2006/0080613 A1* | 4/2006 | Savant | 715/745 |
| 2006/0085259 A1 | 4/2006 | Nicholas et al. | |
| 2006/0122926 A1* | 6/2006 | Hsu et al. | 705/35 |
| 2006/0190281 A1* | 8/2006 | Kott et al. | 705/1 |
| 2006/0208074 A1* | 9/2006 | Eglen et al. | 235/383 |
| 2006/0249570 A1 | 11/2006 | Seifert et al. | |
| 2007/0002057 A1* | 1/2007 | Danzig et al. | 345/473 |
| 2007/0067271 A1* | 3/2007 | Lu | 707/3 |
| 2007/0087831 A1* | 4/2007 | Van Luchene et al. | 463/42 |
| 2007/0203788 A1 | 8/2007 | Andalib et al. | |
| 2007/0208627 A1* | 9/2007 | Abadi | 705/26 |
| 2007/0281690 A1* | 12/2007 | Altman et al. | 455/435.1 |
| 2008/0004983 A1 | 1/2008 | Cohn | |
| 2008/0017721 A1 | 1/2008 | Zehnacker | |
| 2008/0052164 A1* | 2/2008 | Abifaker | 705/14 |
| 2008/0108324 A1 | 5/2008 | Moshir et al. | |
| 2008/0172306 A1 | 7/2008 | Schorr et al. | |
| 2008/0189188 A1* | 8/2008 | Morgenstern | 705/26 |
| 2008/0189189 A1* | 8/2008 | Morgenstern | 705/26 |
| 2008/0208762 A1 | 8/2008 | Arthur et al. | |
| 2008/0257958 A1 | 10/2008 | Rothwell et al. | |
| 2008/0301007 A1 | 12/2008 | Horel et al. | |
| 2008/0313061 A1 | 12/2008 | Eugenio Donato Renato Limlengco | |
| 2009/0018910 A1* | 1/2009 | Jung et al. | 705/14 |
| 2009/0024530 A1 | 1/2009 | Porter et al. | |
| 2009/0055292 A1* | 2/2009 | Chong et al. | 705/27 |
| 2009/0081990 A1 | 3/2009 | Granucci et al. | |
| 2009/0204510 A1 | 8/2009 | Hwang | |
| 2009/0210318 A1 | 8/2009 | Abifaker | |
| 2010/0019045 A1* | 1/2010 | Sarkissian et al. | 235/492 |

OTHER PUBLICATIONS

PCT International Search Report and Written Opinion mailed Dec. 5, 2008, International Application No. PCT/US08/78713, 10 pages.

Metz, Cade, "Make Contact" PC Magazine, Jan. 20, 2004.

Reid, Mike et al., "Online Social Networks, Virtual Communities, Enterprises and Information Professionals—Part 1. Past and Present", Searcher, vol. 15, No. 7, Jul./Aug. 2007.

* cited by examiner

SYSTEMS AND METHODS FOR STORED-VALUE EXCHANGE WITHIN SOCIAL NETWORKING ENVIRONMENTS

BACKGROUND OF THE INVENTION

Gift cards and certificates are a popular way of giving gifts. In a typical gift card scenario, the gift giver travels to a merchant and purchases a card that is associated with a certain amount of stored value, often the purchase price. The giver then mails or delivers the card to the recipient, who redeems the value by traveling to the merchant, picking out an item to purchase, and presenting the gift card as a form of payment. This scenario is inconvenient for both the giver and the recipient, especially if the giver and recipient live in widely separated locations, or if the recipient does not live near a retail location of the merchant at which a received card is redeemable.

BRIEF SUMMARY OF THE INVENTION

In an example embodiment of the invention, a method of operating an electronic social networking environment is performed over a computer network. The method comprises associating, in a database or databases on one or more host computer systems, each of one or more items of stored value with one or more unique account identifiers, one unique identifier for each item of stored value; associating in the database the account identifiers with a user of an electronic social networking environment; transmitting, from the host computer to a user interface of the electronic social networking environment, a summary of the one or more items of stored value; displaying the summary on the user interface; and redeeming at least some of the stored value for a thing of value. In some embodiments, at least one item of stored value may represent actual currency, or may represent virtual currency. In some embodiments, the thing of value may be a physical item or service or may be a virtual item or service. The redemption may take place within the electronic social networking environment. The redemption may take place outside the electronic social networking environment. In some embodiments, the redemption is with one or more merchants. In some embodiments, the redemption may take place online or at a store.

In another example embodiment of the invention, a method of operating an electronic social networking environment is performed over a computer network. The method comprises associating, in a database on a host computer, each of one or more items of stored value with one or more unique account identifiers, one unique identifier for each item of stored value; associating, in the database, the account identifier with a first user of an electronic social networking environment; transmitting, from the host computer to a user interface of the electronic social networking environment, a summary of the one or more items of stored value; displaying the summary on the user interface; and within the electronic social networking environment, transferring at least some of the stored value from the first user to a second user of the electronic social networking environment. In some embodiments, transferring at least some of the stored value comprises giving stored value as a gift from the first user to the second user. In some embodiments, an electronic communication is associated with the transfer of stored value.

In another example embodiment, an electronic social networking environment comprises a host computer system and a computer readable medium storing instructions executable by the host computer system to operate the electronic social networking environment to network at least two users of the social networking environment; associate each of one or more items of stored value with one or more unique account identifiers, one unique account identifier for each item of stored value; associate the account identifiers with a user of the electronic social networking environment; display a summary of the stored value in a user interface of the electronic social networking environment; and enable redemption of at least some of the stored value. The stored value may be redeemed within or outside the electronic social networking environment. The stored value may represent actual currency or may represent virtual currency. The stored value may be redeemed for a physical item or service or for a virtual item or service. The stored value may be redeemed with a merchant.

In another example embodiment, an electronic social networking environment comprises a host computer system and a computer readable medium storing instructions executable by the host computer system to operate the electronic social networking environment to network at least two users of the social networking environment; associate stored value with an account identifier; associate the account identifier with a user of the electronic social networking environment; display a summary of the stored value in a user interface of the electronic social networking environment; and within the electronic social networking environment, transfer at least some of the stored value to a second user of the electronic social networking environment. In some embodiments, the instructions are further executable by the host computer system to enable the first user of the electronic social networking environment to give at least some of the stored value as a gift to the second user of the electronic social networking environment.

DETAILED DESCRIPTION OF THE INVENTION

An electronic social networking environment is a system, usually operated over the Internet as a set of web pages, that enables users of the system to form social networks. The electronic social networking environment typically provides each user of the environment with a home page or website, and provides tools for enabling each user of the environment to track membership in the user's social network, create a profile or summary page about himself of herself that other users can view, and exchange various forms of messages with other users. Often, an electronic social networking environment enables a user to create an ongoing written narrative sometimes called a "weblog", or simply a "blog". Some electronic social networking environments may allow users to upload photographs, video, or music for other users to view or play, may store a social calendar for each user, may host online discussion groups on various topics of interest, and may provide other functions. The electronic social networking environment may allow a user to enter a variety of personal information and control how widely the personal information is shared. Many different electronic social networking environments exist, catering to different clientele.

Communications between users within the electronic social networking environment may take the form of electronic mail, instant messages, or other messaging through electronic means, and may be between individual users or may be sent from one user to a number of other users. An instant message differs from electronic mail in that, if the receiving user is online at the time a message is sent, the entire instant message appears on a receiving user's computer screen nearly instantly after it is sent. By contrast, a recipient of an electronic mail message may be notified that mail has arrived, but may have to open an "inbox" or other separate user interface selection to view the mail content. Instant messaging allows users to conduct ongoing near-real-time typed conversations.

Some examples of electronic social networking environments in operation as of 2007 include MySpace, Facebook, LinkedIn, Yahoo! 360°, Friendster, Xanga, and a host of others. More information about electronic social networking environments can be found in the following articles, the entire disclosures of which are incorporated by reference herein:

Mike Reid and Christian Gray, *Online Social Networks, Virtual Communities, Enterprises, and Information Professionals—Part* 1. *Past and Present*, Searcher, Vol. 15 Number 7, July/August 2007.

Cade Metz, *Make Contact*, PC Magazine, Jan. 20, 2004.

Ina O'Murchu, John G. Breslin, Stefan Decker, *Online Social and Business Networking Communities*, Digital Enterprise Research Institute Technical Report 2004-08-11, August 2004.

For the purposes of this disclosure, stored value is any form of value tracked in an account and associated with a payment device. One example use of stored value is a department store gift card. When a gift card is purchased, the purchase price is accepted by the card issuer and the card is "activated" by associating the card with the account. Each card comprises a unique account identifier, which may be a number, an alphabetic or alphanumeric sequence, or another kind of identifier. Upon activation, a processing computer system records the account identifier and the amount of stored value. The amount of stored value need not equal the purchase price. The card itself is a form of payment device. A payment device is any device used to redeem value from the account upon presentation of the device. While a card is one example of a payment device, may other kinds of payment devices are possible. When the card is presented for payment during a purchase transaction, the merchant communicates to the processing computer system that the presenter of the card wishes to use the value in the account to make a purchase, and indicates the value of the purchase and the account identifier from the card. The processing computer system informs the merchant whether sufficient value is in the account to make the proposed purchase. Once the purchase is complete, the amount of the purchase or the amount that was in the account before the purchase (whichever is smaller) is deducted from the respective account. The entity that operates a processing computer system may sometimes be called an acquirer.

Various aspects of stored value accounts, their creation, activation, and management are described in U.S. Pat. No. 7,083,081 of McGee et al., entitled "Electronic Card and Ticket and Methods for Their Use", U.S. patent application Ser. No. 10/286,006 of James et al., entitled "Stored Value Currency Conversion Systems and Methods", U.S. patent application Ser. No. 10/371,167 of Baumgartner, entitled "Methods and Systems for Coordinating a Change in Status of Stored-Value Cards", U.S. patent application Ser. No. 10/922,815 of McGee et al., entitled "Stored Value Lottery Card and Methods", U.S. patent application Ser. No. 11/122, 414 of Seifert et al., entitled "System and Method for Accounting for Activation of Stored Value Cards", and U.S. patent application Ser. No. 11/382,882 of McGee et al., entitled "Anti-Fraud Presentation Instruments, Systems and Methods", the entire disclosures of which are incorporated herein by reference.

The gift card described above is a form of payment device. Many other kinds of payment devices are possible. A payment device is any item comprising a unique account identifier and used for redeeming value from the account upon presentation of the payment device. A payment device may be a card having the account identifier encoded on it magnetically, by a bar code, electronically, or by another means. A payment device may be a "contactless" device that stores the account identifier in a memory and wirelessly transmits the identifier to a contactless reader using a wireless link such as radio frequency (RF) link, a Bluetooth link, a near field communication (NFC) link, a carrier-based wireless link, or another kind of wireless link. A payment device may be a portable electronic device such as a cellular telephone that stores an account identifier and communicates the identifier to a merchant at the time of a purchase. Other kinds of payment devices are possible, including a printed paper or simply a number. Various aspects of payment devices are described in U.S. patent application Ser. No. 10/665,984 of McGee et al., entitled "Financial Presentation Instruments with Integrated Holder and Methods for Use", U.S. patent application Ser. No. 11/551,063 of Newbrough et al., entitled "Presentation Instrument with Non-Financial Functionality", and U.S. patent application Ser. No. 11/782, 526 of Zehnacker, entitled "Mobile Payment Device with Magnetic Stripe", the entire disclosures of which are incorporated herein by reference.

Figure 1:
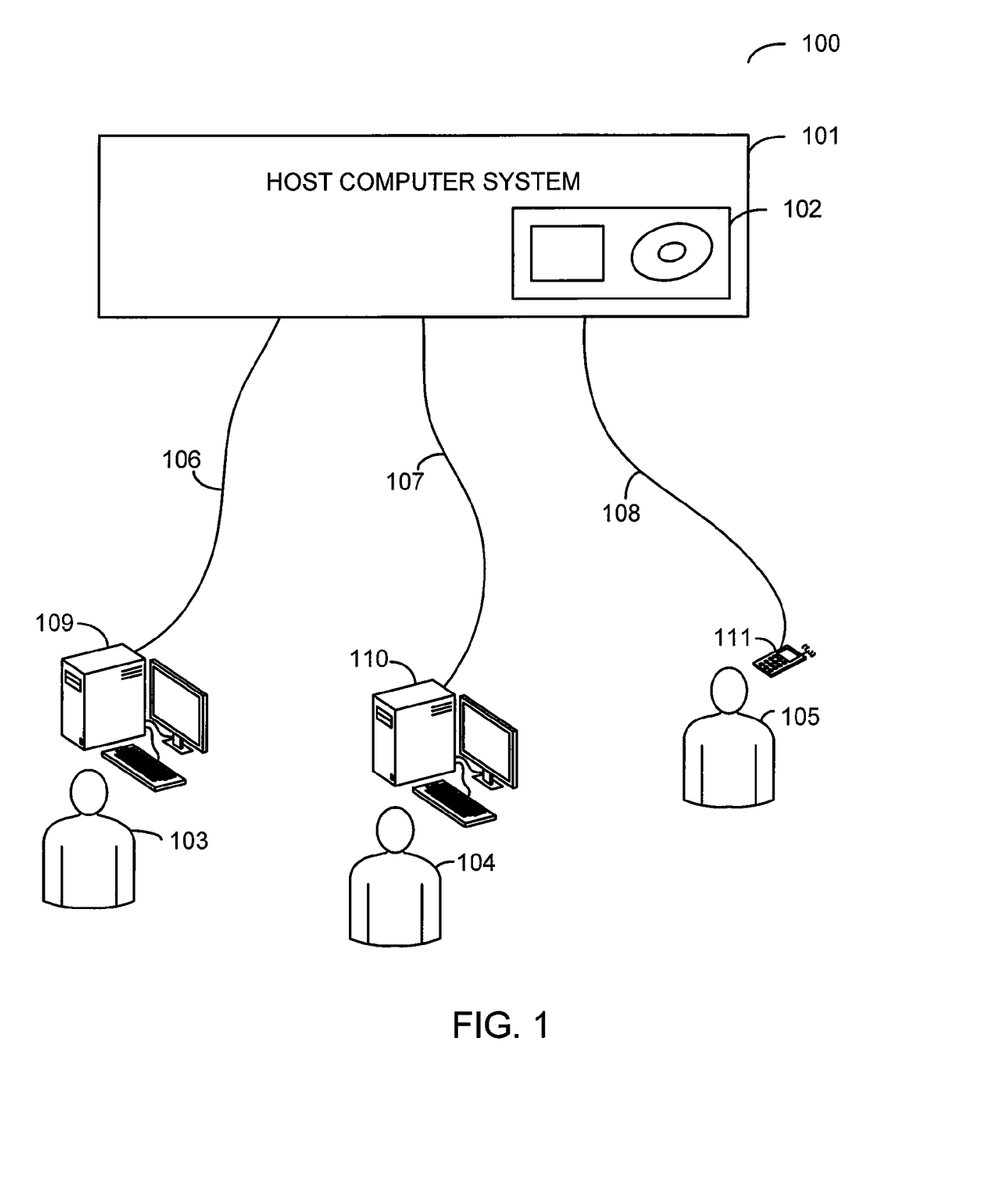
FIG. 1 shows a simplified block diagram of a system for operating an electronic social networking environment, in accordance with an example embodiment of the invention.

FIG. 1 shows a simplified block diagram of a system for operating an electronic social networking environment 100, in accordance with an example embodiment of the invention. Host computer system 101 comprises various forms of computer-readable storage media 102. Storage media 102 may comprise volatile storage such as random access memory (RAM), may comprise nonvolatile storage such as one or more magnetic or optical disks, may comprise other kinds of storage, or may comprise any of these in any combination. Storage 102 is used to store data related to the operation of electronic social networking environment 100, and also to store instructions that are executable by host computer system 101 to operate the electronic social networking environment 100. While host computer 101 is represented in FIG. 1 as a single block, it may in fact be multiple interconnected computers, which may be co-located or widely distributed, and may be connected by one or more electronic or wireless networks. Similarly, storage 102 may be widely distributed.

Various users 103, 104, 105 connect to host computer system 101 through network connections 106, 107, 108. Preferably, network connections 106, 107, 108 comprise part of the Internet, a global network of interconnected networks. The network connections shown in FIG. 1 are greatly simplified for ease of explanation. There may be many intermediate computer systems and other network devices between any particular user and host computer system 101. The details of the network infrastructure are not important for understanding the invention, and the system can be modeled by the arrangement of FIG. 1. Of course, the system of FIG. 1 shows only a few representative users 103-105 and connections 106-108. An actual social networking environment may have many subscribers, some portion of which may be online at any given time.

Network connections 106, 107, 108 may be wired connections or wireless connections, and need not all be of the same kind. For example, any of the connections may be a telephone connection, an Ethernet connection, a wireless carrier connection, or another kind of connection. Each connection may take different forms at different points between a user and host computer system 101.

Commonly, a user accesses the electronic social networking environment 100 using a computer, such as computer 109 or computer 110. However, the electronic social networking environment 100 may also be accessed using other kinds of devices, for example mobile telephone 111. For the purposes of this disclosure, sending or transferring a message or value "to a user" includes placing the message or an account number or other account identifier associated with the value in computer storage accessible to the user.

In one example embodiment, host computer 101 operates the electronic social networking environment 100 as a set of web pages, serving the web pages in reaction to inputs from users.

Figure 2:
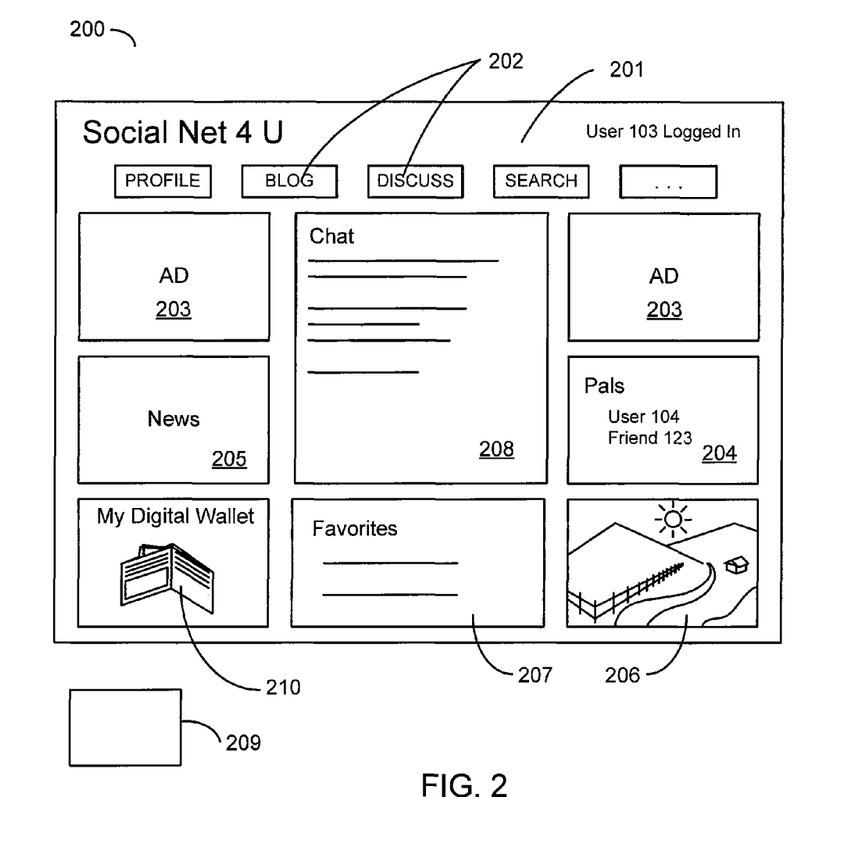
FIG. 2 shows an example user interface to the electronic social networking environment of FIG. 1.

FIG. 2 shows a user interface 200 to electronic social networking environment 100, in accordance with an example embodiment of the invention and as may be seen by user 103. A nearly infinite variety of other user interface arrangements are possible. User interface 200 may comprise a banner area 201 showing a title, advertising, announcements, or other information. Various icons, web links, or buttons 202 allow navigation to other parts of the electronic social networking environment, for example for updating a user's personal information, for participating in a discussion group, for searching for other users, or for other purposes. Advertisements 203 may be displayed in a fixed, rotating, or random selection. An area 204 lists other users of the electronic social networking environment to which the user 103 has affiliated, for example by inviting the other users to become "pals", "friends", or "connected" with the first user. Other areas of the screen may show news items 205, photos 206, links to favorite web sites 207, or other items. A chat window 208 displays some instant messages exchanged by user 103 and other users of the environment. For the purposes of this disclosure, an instant message is one that appears on a receiving user's computer screen nearly instantly after it is sent, whether in a traditional chat environment, in a popup window, or by another means.

In accordance with an example embodiment of the invention, a digital wallet 209 is represented by screen icon 210. Digital wallet 209 contains a record of stored value that user 103 has acquired and has access to. Preferably, digital wallet 209 is stored as a secure computer file or in one or more databases on host computer 101, but the digital wallet 209 may be stored on computer 109 used by user 103, on a portable storage medium such as a flash memory card, on a portable electronic device such as a cellular telephone, or in another location.

Figure 3:
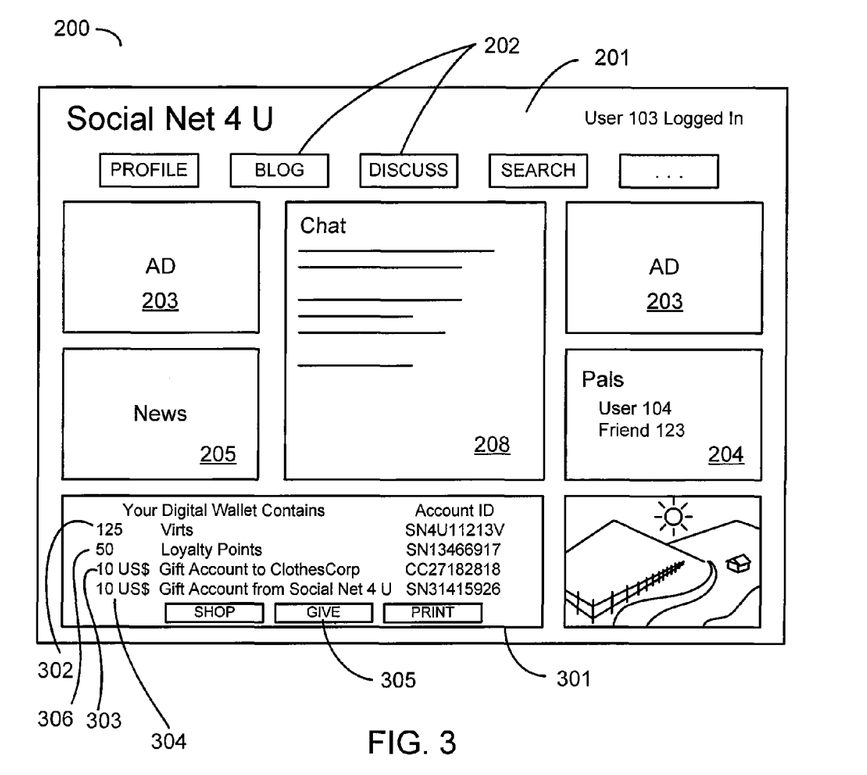
FIG. 3 shows the user interface of FIG. 2 as it may look after a user clicks a digital wallet screen icon, in accordance with an example embodiment of the invention.

FIG. 3 shows user interface 200 as it may look after user 103 clicks the digital wallet screen icon 210. A view of the contents of digital wallet 209 is shown in screen area 301. In this example, user 103 has accumulated 125 units of virtual currency 302, 50 loyalty points 306, a $10 gift account 303 to a particular clothing store ClothesCorp, and a $10 gift account 304 in the name of the social networking environment and redeemable at multiple merchants. In this example, the virtual currency unit has been given the name "virt", but of course any name may be chosen. Loyalty points may be thought of as a form of virtual currency, but may also sometimes exchanged for an item of actual value.

Each of these forms of value is associated with a unique account identifier, which is further associated with a user of the system by virtue of being placed in the user's digital wallet. In the example of FIG. 3, four unique account identifiers are associated with user 103, one for each of the items in the user's digital wallet. The account identifiers may be but need not be visible to the user.

Users of electronic social networking environment 100 may accumulate items in their digital wallets by a variety of methods. For example, the operator of the social networking environment may periodically grant virtual currency or loyalty points to users as a way of rewarding loyal use of the electronic social networking environment. This may be accomplished by simply adding an amount of virtual currency or points to the record in digital wallet 209 stored on host computer 101.

Another way for a user to accumulate value in a digital wallet may be to purchase virtual currency in exchange for actual currency (for example, United States dollars) from the operator of the social networking environment or on an open exchange that trades virtual and actual currencies. The environment operator then adds the purchased virtual currency amount to the record in the digital wallet.

Another way for a user to accumulate value in a digital wallet may be to deposit actual currency with the operator of the social networking environment. The operator then records in the user's digital wallet the value denominated in actual currency. The value may be presented in the form of a gift account issued by the operator of the electronic social networking environment, in the form of a gift account redeemable at a particular merchant, or in another form.

Figure 4:
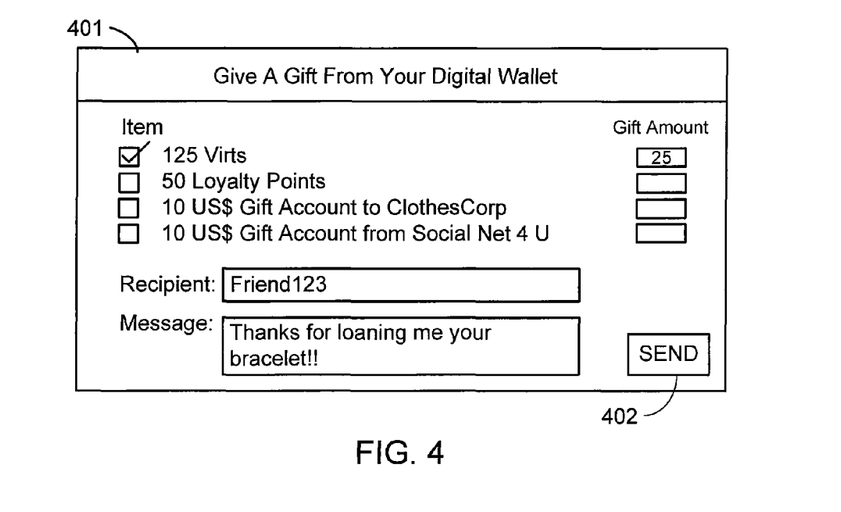
FIG. 4 shows an example window that may be presented to user of the electronic social networking environment of FIG. 1.

In accordance with an example embodiment of the invention, user 103 may receive value into his or her digital wallet 209 by way of a transfer from another user, or may transfer value from his or her digital wallet 209 to another user. A transfer of value may be a gift from one user to another. In the example of FIG. 3, user 103 clicks on the "Give" button 305 in screen area 301. FIG. 4 shows an example window 401 that may be presented to user 103. In window 401, user 103 can select which form of stored value to give, how much of the value to give, and to whom to give it. User 103 may also compose a message to accompany the gift. The message may be sent to the receiving user in the form of an electronic communication. For the purposes of this disclosure, electronic communication includes, without limitation, electronic mail, an instant messaging, or other messaging through electronic means.

When the gift is a gift of virtual currency, the gift amount may be simply deducted from the respective account in the digital wallet record of the giving user and added to the digital wallet record of the receiving user. When each user has virtual currency in his or her digital wallet, account identifiers already exist, and only the stored value amount need be changed.

When the gift is in units of actual currency and the gift comprises all of the value of a given type from the giver's digital wallet, the unique account identifier may need only be moved from the giver's digital wallet to the receiver's digital wallet. For example, if user 103 gives the entire $10 ClothesCorp gift account balance to another user, no new account identifier need be created, but host computer 101 simply removes the amount from the digital wallet of user 103 and adds it to the digital wallet of the receiving user.

When the gift is in units of actual currency and the gift comprises less than the full value in the giving user's account, a new unique account identifier may be created for tracking the value in the receiving user's account. For example, if user 103 gives half of the ClothesCorp gift account balance to another user, the unique account identifier associated with user 103 remains the same, but the associated stored value is simply reduced by $5. A new unique account identifier is created and associated with the receiving user, and $5 of stored value is recorded in the receiving user's digital wallet. Preferably, the operator of the electronic social networking environment and the merchant (ClothesCorp in this example) have an agreement that allows the social networking environment operator to create account identifiers and manage the funds transfers locally. Alternatively, the social network operator may accomplish the transfer by performing a redemption transaction with the merchant for $5 of the value from the digital wallet of user 103, and then perform a purchase transaction with the merchant for the $5 of stored value placed in the receiving user's digital wallet.

Once user 103 clicks the "Send" button 402 in window 401, the transfer of value is performed, and the associated message is sent to the receiving user.

Figure 5:
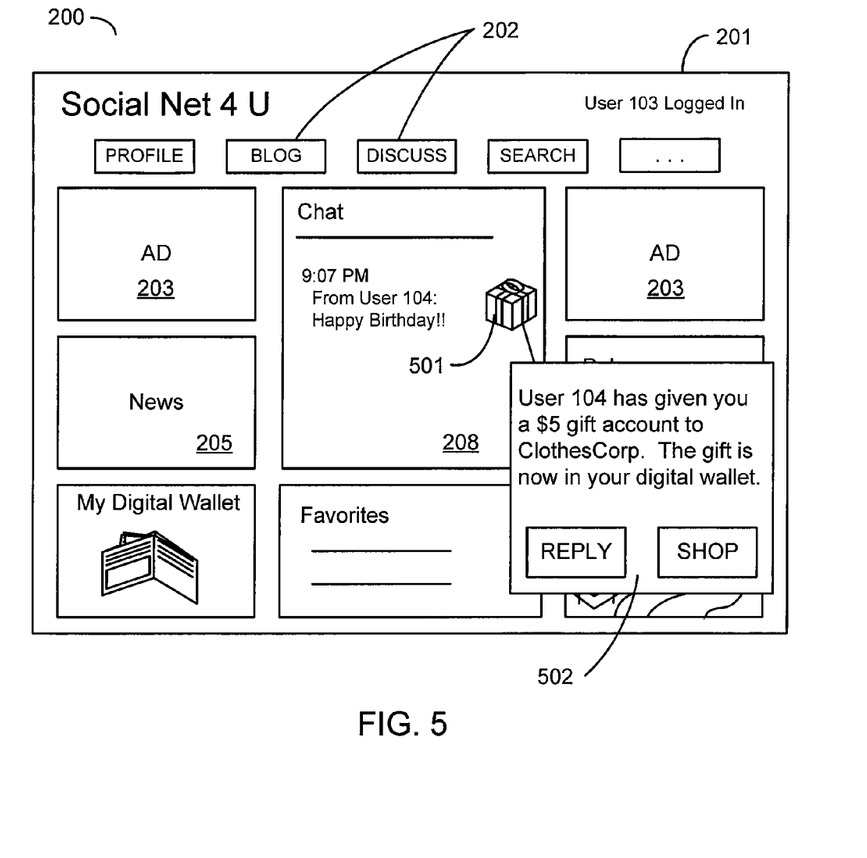
FIG. 5 shows the screen of a user after the user has received a gift from another user, in accordance with an example embodiment of the invention.

FIG. 5 shows the screen of user 103 after user 103 has received a gift from another user, in accordance with an example embodiment of the invention. An electronic communication in the form of an instant message appears in chat window 208. The instant message may have an associated icon 501 that emphasizes that the message is associated with a gift. The receiving user may click on the icon to view information about the gift, such as in pop-up window 502.

Redemption of stored value may be accomplished in any of a number of ways. For the purposes of this disclosure, redeeming value from an account may sometimes be referred to as redeeming an account.

In accordance with one example embodiment of the invention, stored value may be redeemed within the electronic social networking environment. For example, various aspects of a user's social networking page may be customizable. The user may be able to change the background, sometimes called wallpaper, of his or her page. Various wallpapers may be selectable, or may be available from other sites. While many of these wallpapers may be available for no charge, the social networking environment may offer premium wallpapers in exchange for value from the user's digital wallet. The premium wallpapers may be, for example, professionally designed or may carry a proprietary name brand or logo.

Figure 6:
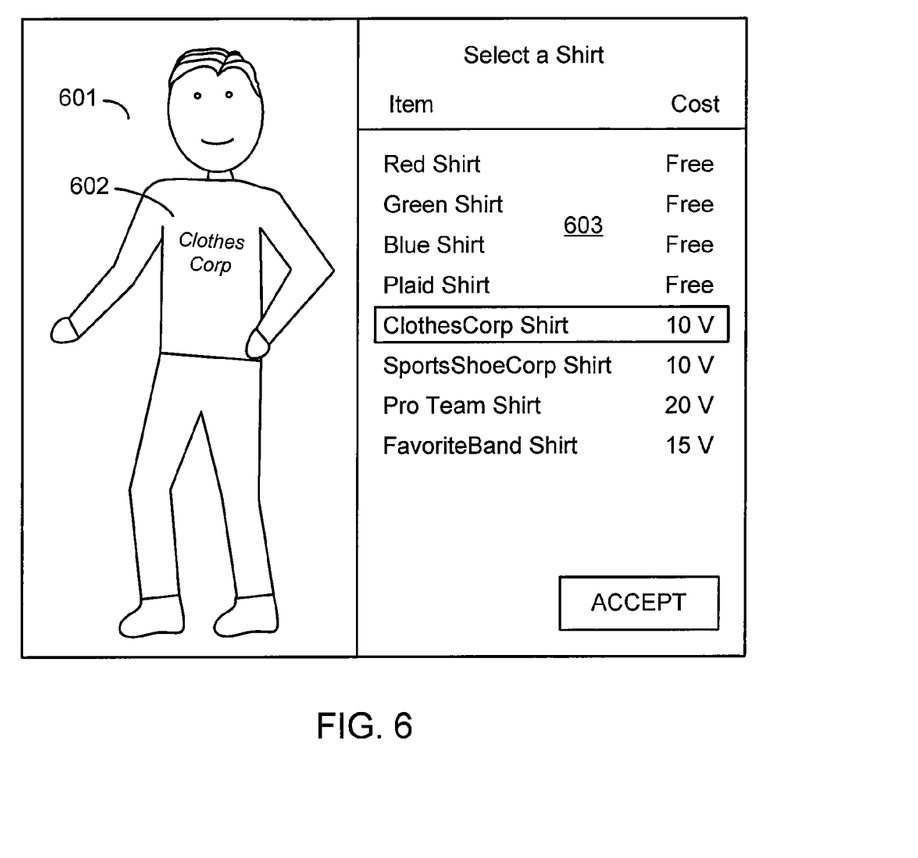
FIG. 6 shows an example user interface for dressing an avatar, in accordance with an example embodiment of the invention.

Some social networking environments provide each user with a customizable iconic representation of himself or herself, often called an avatar. A user's avatar may be customizable. The user may be able to change his or her avatar's hair style and color, facial features, and clothing. FIG. 6 shows an example user interface for dressing an avatar, with the ability to redeem stored value for premium clothing, in accordance with an example embodiment of the invention. In FIG. 6, avatar 601 is presented wearing a shirt 602. The user selects the color and style of the shirt from menu 603. Some selections in menu 603 carry no charge, but some premium selections require that the user trade value in order to adopt them. Upon selection of a premium item, and preferably after confirmation from the user, the item is shown on the user's avatar, and the requisite value is deducted from the respective account record in the user's electronic wallet. That is, the balance of the account is reduced by the amount of stored value redeemed. In this example, by choosing a premium avatar shirt at a cost of 10 virts, the user has redeemed stored value representing virtual currency for a thing of value within the electronic social networking environment. In this example, the thing of value is a virtual item—the premium avatar shirt and the right to display it. Virtual services may also be available. For example, a user may trade stored value for an "avatar makeover", which would give the user's avatar a hairstyle, coloring, or other characteristics not available without payment.

While the examples above illustrated purchasing a virtual item or service with value representing virtual currency, virtual items or services may be purchased for actual value. For example, the prices for premium avatar clothing may be given in actual currency units, and actual value from the user's digital wallet may be spent to purchase the premium items.

In another example embodiment, stored value may be redeemed within the electronic social networking environment with a merchant. For example, the operator of electronic social networking environment 100 may cooperate with one or more merchants to offer a limited catalog of the merchants' wares on a shopping page within electronic social networking environment 100. A user may be given the option of spending actual currency stored value from his or her digital wallet to make a purchase of a physical item or service. For the purposes of this disclosure, a physical item or service is one that is not virtual. That is, a physical item or service exists in the real world.

Figure 7:
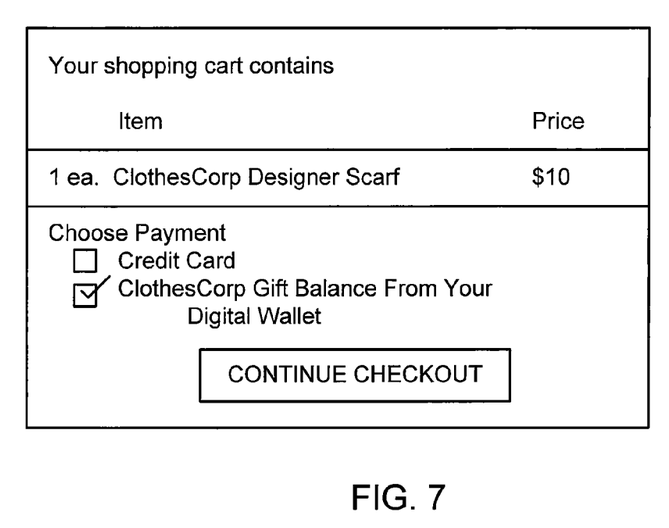
FIG. 7 shows a portion of a checkout process, in accordance with an example embodiment of the invention.

FIG. 7 shows a portion of a checkout process, in accordance with an example embodiment of the invention. In FIG. 7, the shopping page control software has recognized that the user has selected a clothing item from ClothesCorp, and that the user has a ClothesCorp gift account balance in his or her digital wallet. The system has offered the user the choice of using the gift account balance as a form of payment for the item. If the user selects the gift account as the payment device, the transaction may be settled using existing systems and methods for processing gift card transactions. In this example, the user has redeemed stored value representing actual currency for a physical thing of value with a merchant within the electronic social networking environment.

In another example embodiment, the stored value may be redeemed outside the electronic social networking environment. This may be accomplished in any of a variety of ways.

Referring again to FIG. 3, screen area 301 offers a choice to print a gift certificate. For example, user 103 may select the ClothesCorp balance, and print a paper certificate similar to the example shown in FIG. 8. In this example, the unique account identifier is encoded on the certificate using a bar code. At the time the certificate is printed, the corresponding stored value may be removed from the user's digital wallet, but preferably is left in place, so that both a virtual gift certificate (in the digital wallet) and a paper certificate exist simultaneously, both being associated with the same stored value. Systems and methods for associating stored value to virtual and physical payment devices simultaneously are described in U.S. Pat. No. 7,054,842 to James et al., titled "Stored Value Cards and Methods for Their Issuance", the entire disclosure of which is herein incorporated by reference.

Figure 8:
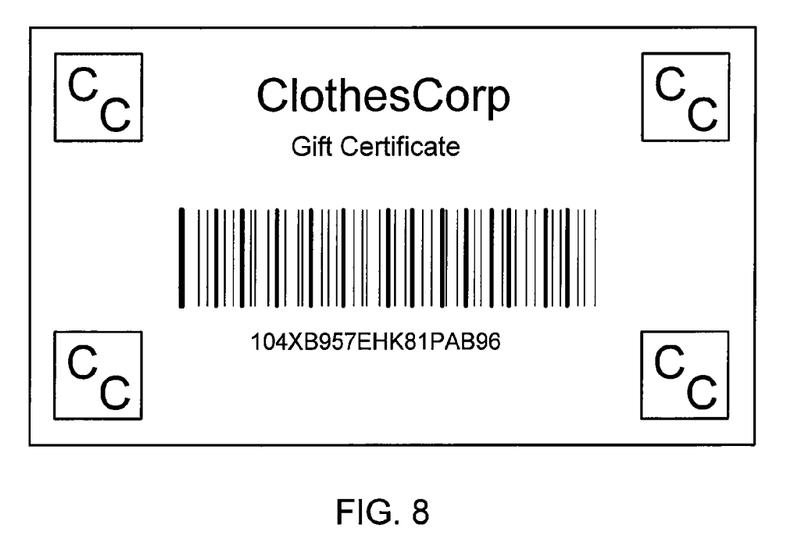
FIG. 8 shows an example printed paper gift certificate.

Once the paper certificate is printed, the user may carry it to a "brick and mortar" store and exchange it for goods or services in the typical way. The paper certificate is another form of payment device. Such a redemption is an example of redeeming stored value representing actual currency for a thing of value outside the electronic social networking environment.

The security of the paper certificate may be enhanced in various ways. For example, counterfeiting may be discouraged by an account numbering scheme that makes it unlikely that a potential counterfeiter could arrive at a working account number by chance. The system may require the user to select a personal identification number (PIN) associated with the certificate and the PIN may be required for redemption. In this way, the risk to the user from loss or theft of the certificate is reduced. The certificate may be duplicated, but the merchant and processing system will ensure that the stored value is only spent once so that the merchant faces no risk from the duplication of certificates. If the user redeems the stored value electronically after printing a certificate, the printed certificate becomes worthless.

Rather than print a paper certificate, the user may provision the stored value account identifier to a cellular telephone or other portable electronic device, which can then be used as a payment device. Systems and methods for enabling such a transfer are described in U.S. patent application Ser. No. 11/830,459 of Arthur et al., entitled "Payments Using A Mobile Commerce Device", the entire disclosure of which is incorporated herein by reference.

Figure 9:
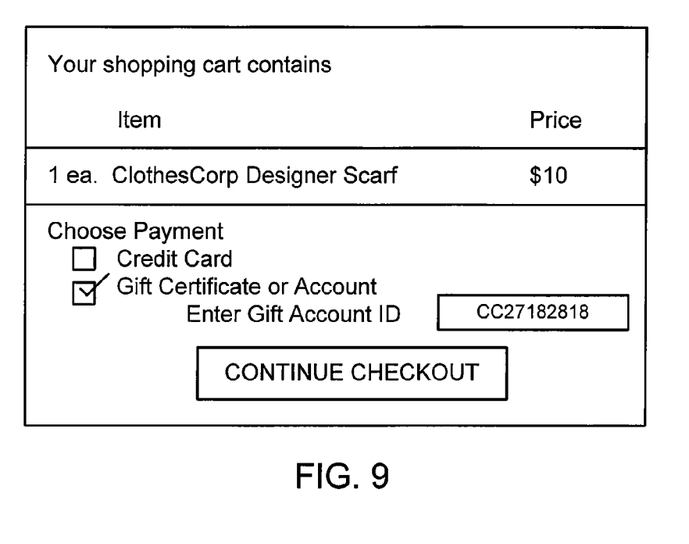
FIG. 9 shows a portion of a checkout process, in accordance with an example embodiment of the invention.

Stored value may be redeemed outside the electronic social networking environment in other ways as well. For example, the user may shop online at a merchant's website (outside the electronic social networking environment), and pay for purchases using the electronic gift account from his or her digital wallet. In this case, the user may be required to enter the unique account identifier from the electronic gift account, as shown in FIG. 9. The redemption is handled by existing methods and systems. For example, host computer 101 may communicate with a payment processing computer system for completing the transactions. The payment processing computer system may in turn communicate with various banks or other financial institutions as needed.

Figure 10:
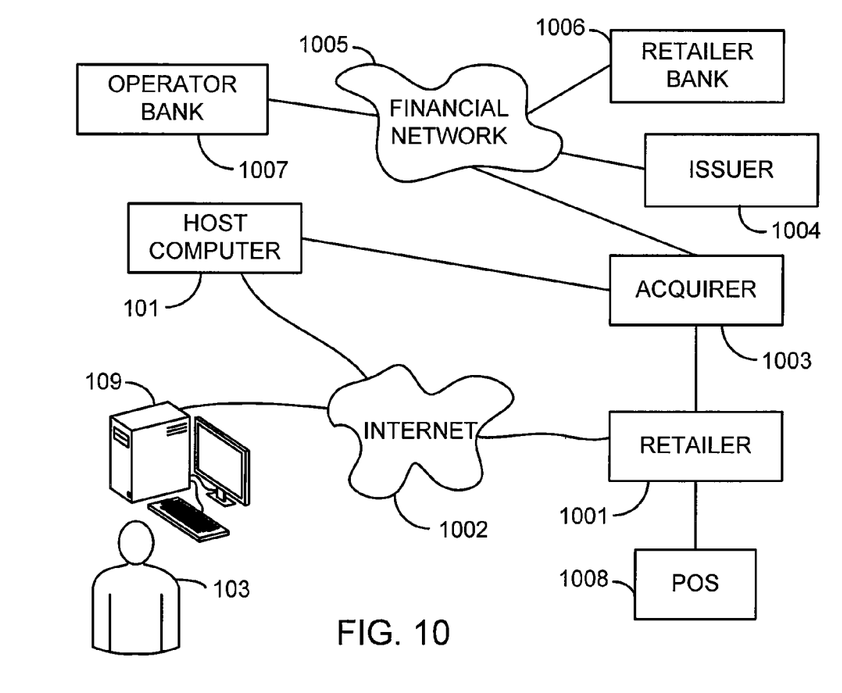
FIG. 10 shows a payment system, in accordance with an example embodiment of the invention.

FIG. 10 shows a payment system, in accordance with an example embodiment of the invention, for redeeming stored value from a user's digital wallet with a retailer outside the electronic social networking environment. In this example, user 103, using computer 109, wishes to buy an item from the website of retailer 1001. A checkout screen may look like the example shown in FIG. 9. User 103 has accessed retailer 1001 through the Internet 1002, and also to access the electronic social networking environment running on host computer 101. If user 103 elects to pay by credit card, user 103 will be prompted to enter a credit card number and the transaction will proceed in the usual way. That is, retailer 1001 contacts acquirer 1003 for credit card approval. Acquirer 1003 may contact issuer 1004 through financial network 1005 to verify that the credit card account has sufficient available credit, and pass the approval back to retailer 1001. Retailer's bank 1006 and issuer 1004 may later settle the transaction by an exchange of funds over financial network 1005.

Alternatively, user 103 may wish to offer one of the stored value balances in his or her digital wallet as payment. In this case, the user is prompted for a stored value account identifier. That identifier is sent to acquirer 1003 for approval. Acquirer 1003 recognizes the identifier as unique to a stored value account used in the electronic social networking environment, and contacts host computer 101 for approval. The kinds of stored value that retailer 1001 will accept from host computer (actual value, virtual value, loyalty points, etc) are defined in a pre-existing agreement between retailer 1001 and the operator of the electronic social networking environment. If the account identifier corresponds to an account of an approved type, and the account has sufficient value, the transaction is approved. Operator's bank 1007 and retailer's bank 1006 may later settle the transaction. Other arrangements are possible. For example, any or all of retailer 1001, issuer 1004, or the operator of the electronic social networking environment may outsource the maintenance and tracking of accounts to acquirer 1003, which then may be able to approve or disapprove transactions without contacting another entity.

Similarly, multiple merchants may cooperate with the operator of the electronic social networking environment to accept value stored within the electronic social networking environment as payment. In the example of FIG. 3, the user's digital wallet contained a $10 gift account issued by the electronic social networking environment, redeemable with multiple merchants. A shopping page within the social networking environment may accept the gift account as a source of payment for items from multiple merchants. Additionally, the merchants may accept the gift account at their own websites (external to the electronic social networking environment), and may accept payments from the gift account at their brick and mortar store locations.

In some embodiments, stored value representing a virtual form of currency may be redeemed for a item or service of actual value. Loyalty points are used as an example, but other forms of virtual currency may be used as well. Loyalty points may be granted by the operator of the electronic social networking environment and accumulated in a user's digital wallet. These points may be thought of as a form of virtual currency, as they are not denominated in terms of any actual currency and can be granted at will by the operator of the environment. However, they need not be thought of as purely virtual in value, as they may be exchanged in some cases for physical items or services, and therefore may be considered to have actual value. For example, the operator of the electronic social networking environment may allow a user to exchange loyalty points for actual, physical t-shirts, caps, or other promotional items that promote the electronic social networking environment. Or the operator of the electronic social networking environment may cooperate with a beverage retailer to enable social networking environment loyalty points to be exchanged for cups of coffee or the like. Or the operator of the electronic social networking environment may cooperate with a telecommunications provider to enable social networking environment loyalty points to be exchanged for cellular telephone airtime minutes. Many other relationships are possible.

Such a transaction would proceed in a way similar to a transaction in which actual value is exchanged for a physical item of actual value, using a payment system similar to that shown in FIG. 10. For example, user 103 may print a certificate similar to that shown in FIG. 8, representing stored loyalty points in his or her digital wallet. User 103 may present the printed certificate for payment at retailer 1001, where it may be scanned by a point-of-sale (POS) device 1008. The account identifier is sent to acquirer 1003, which contacts the operator of the social networking environment for transaction approval. Assuming the transaction is approved, the settlement of the transaction may effect an implicit exchange rate between the virtual units and physical item values. For example, the operator of the electronic social networking environment may assign a value of 100 loyalty points to a cup of coffee purchased at retailer 1001. Retailer 1001 may agree with the operator of the electronic social networking environment to provide coffee to users of the environment for 25 cents per points-based transaction. User 103 need not know the agreed-upon price between the operator and the retailer, and may perceive that he or she is "buying" an item worth much more. Once the transaction is approved, it is settled by the operator by deducting the 100 loyalty points from the digital wallet of user 103, and transferring 25 cents from operator's bank 1007 to retailer's bank 1006 through financial network 1005. Of course, the actual point values and prices will be determined on a case-by-case basis by the operator and various retailers.

The invention has now been described in detail for the purposes of clarity and understanding. However, those skilled in the art will appreciate that certain changes and modifications may be practiced within the scope of the appended claims.

What is claimed is:

1. A method for operating an electronic social networking environment, the method comprising:
providing mobile applications to authorized users of the electronic social networking environment for installation on mobile devices respectively associated with the authorized users;
processing, by a first server of a server system, information received by the server system over an electronic network, the information entered by the authorized users via one or more user interfaces facilitated by the server system, and providing, via the one or more user interfaces, control to the authorized users over how widely personal information entered by the authorized users is shared with other users;
routing, by the server system via the electronic network, electronic communication between the mobile devices and/or other computing devices associated with users of the electronic social networking environment;
associating, by the server system, in one or more databases hosted by the server system, each of one or more stored value accounts with one or more unique account identifiers, one unique account identifier for each stored value account, each stored value account having a balance, such that the one or more stored value accounts are administered by an operator of the electronic social networking environment;
associating, in the one or more databases by the server system, the one or more account identifiers with a particular user of the authorized users of the electronic social networking environment;

transmitting, by a mobile wallet server of the server system over the electronic network, from the server system to a first device associated with the particular user of the authorized users of the electronic social networking environment, a summary of the one or more stored value accounts for display with a first user interface, where the transmitting causes one or more user-selectable options enabling selection of at least one of the stored value accounts for transfer;
processing, by the mobile wallet server of the server system, one or more transmissions from the first device that correspond to one or more selections of the one or more user-selectable options, and, responsive to the one or more transmissions, processing an identifier of a second user and generating a transfer notification of the transfer of a first value from the at least one of the stored value accounts, the generating the transfer notification comprising retrieving provisioning details stored by the server system and associated with the second user, and, based at least in part on the provisioning details, forming the transfer notification to transmit to a mobile device associated with the second user;
pushing, by the mobile wallet server of the server system, the transfer notification over a wireless communication channel to the mobile device associated with the second user when the mobile device is not online with the server system, the transfer notification causing activation of an application installed on the mobile device to activate on the mobile device a prompt regarding the transfer, the prompt comprising a user-selectable option to facilitate network-based communication between the mobile device and the server system when the mobile device comes online;
receiving, by the server system, a transaction approval request from a payment processing computer system, the transaction approval request requesting approval of a transaction being attempted at a merchant outside the social networking environment, the transaction using value from a second stored value account associated with the second user and selected for redemption;
comparing, by the server system, a value of the transaction with the amount of value in the second stored value account selected for redemption; and
transmitting, by the server system to the payment processing computer system, an approval or denial of the transaction.

2. The method of claim 1, wherein further comprises:
enabling selection of the second stored value account for redemption further at least partially by enabling printing of a certificate identifying stored value from the second stored value account selected for redemption.

3. The method of claim 1, wherein further comprises:
enabling selection of the second stored value accounts for redemption further at least partially by enabling storing of an identifier of the second stored value account selected for redemption to the mobile device associated with the second user for use as a payment device.

4. The method of claim 1, wherein the second stored value account selected for redemption represents actual currency.

5. The method of claim 1, wherein the second stored value account selected for redemption represents virtual currency or loyalty points.

6. The method of claim 1, wherein the server system transmits an approval of the attempted transaction, and the method further comprises:

reducing, by the server system in the one or more databases, a balance of the second stored value account selected for redemption by the amount redeemed in the transaction.

7. The method of claim 6, further comprising:
sending, by the server system, a direction to transfer funds to a bank associated with the merchant, in settlement of the transaction.

8. The method of claim 7, wherein the sending the direction to transfer funds to the bank associated with the merchant, in settlement of the transaction, further comprises sending a direction to transfer funds in an amount that reflects an implicit exchange rate between the currency of the second stored value account selected for redemption and the value of an item purchased in the transaction.

9. A host computer system for operating an electronic social networking environment, the host computer system comprising:
a server system comprising one or more servers and memory storing instructions that when executed by the server system processor cause the server system to:
provide mobile applications to authorized users of the electronic social networking environment for installation on a mobile devices respectively associated with the authorized users;
process, by a first server of the one or more servers, information received by the server system over an electronic network, the information entered by the authorized users via one or more user interfaces facilitated by the server system, and provide, via the one or more user interfaces, control to the authorized users over how widely personal information entered by the authorized users is shared with other users;
route electronic communication between the mobile devices and/or other computing devices associated with the authorized users of the electronic social networking environment;
associate, in one or more databases hosted by the server system, each of one or more stored value accounts with one or more unique account identifiers, one unique account identifier for each stored value account, each stored value account having a balance, such that the one or more stored value accounts are administered by an operator of the electronic social networking environment;
associate, in the one or more databases, the one or more account identifiers with a particular user of the authorized users of the electronic social networking environment;
transmit, by a mobile wallet server of the one or more servers over the electronic network, from the server system to a first device associated with the particular user of the authorized users of the electronic social networking environment, a summary of the one or more stored value accounts for display with a first user interface, where the transmitting causes one or more user-selectable options to enable selection of at least one of the stored value accounts for transfer;
process, by the mobile wallet server of the server system, one or more transmissions from the first device that correspond to one or more selections of the one or more user-selectable options, and, responsive to the one or more transmissions, processing an identifier of a second user and generating a transfer notification of the transfer of a first value from the at least one of the stored value accounts, the generating the transfer notification comprising retrieving provisioning details stored by the server system and associated with the second user, and, based at least in part on the provisioning details, forming the transfer notification to transmit to a mobile device associated with the second user;
push, by the mobile wallet server of the server system, the transfer notification over a wireless communication channel to the mobile device associated with the second user when the mobile device is not online with the server system, the transfer notification causing activation of an application installed on the mobile device to activate on the mobile device a prompt regarding the transfer, the prompt comprising a user-selectable option to facilitate network-based communication between the mobile device and the server system when the mobile device comes online;
receive a transaction approval request from a payment processing computer system, the transaction approval request requesting approval of a transaction being attempted at a merchant outside the social networking environment, the transaction using value from a second stored value account associated with the second user and selected for redemption;
compare a value of the transaction with the amount of value in the stored value account selected for redemption; and
transmit, to the payment processing computer system, an approval or denial of the transaction.

10. The host computer system of claim 9, wherein the instructions further cause the server system to enable printing of a certificate identifying stored value from the second stored value account selected for redemption.

11. The host computer system of claim 9, wherein the instructions further cause the server system to enable storing of an identifier of the second stored value account selected for redemption to the mobile device associated with the second user for use as a payment device.

12. The host computer system of claim 9, wherein the second stored value account selected for redemption represents actual currency.

13. The host computer system of claim 9, wherein the second stored value account selected for redemption represents virtual currency or loyalty points.

14. The host computer system of claim 9, wherein the server system transmits an approval of the attempted transaction, and wherein the instructions further cause the server system to reduce a balance of the second stored value account selected for redemption by the amount redeemed in the transaction.

15. The host computer system of claim 14, wherein the instructions further cause the server system to send a direction to transfer funds to a bank associated with the merchant, in settlement of the transaction.

16. A method for operating an electronic social networking environment, the method comprising:
providing mobile applications to authorized users of the electronic social networking environment for installation on a mobile devices respectively associated with the authorized users;
processing, by a first server of a server system, information received by the server system over an electronic network, the information entered by the authorized users of the electronic social networking environment via one or more user interfaces facilitated by the server system, and providing, via the one or more user interfaces, control to the authorized users over how widely personal information entered by the authorized users is shared with other users;

facilitating, by the server system via the electronic network, electronic communication between the mobile devices and/or other computing devices associated with the authorized users of the electronic social networking environment;

associating, by the server system, in one or more databases hosted by the server system, each of one or more stored value accounts with one or more unique account identifiers, one unique account identifier for each stored value account, each stored value account having a balance, such that the one or more stored value accounts are administered by an operator of the electronic social networking environment;

associating, in the one or more databases by the server system, the one or more account identifiers with a particular user of the authorized users of the electronic social networking environment;

transmitting, by a mobile wallet server of the server system over the electronic network, from the server system to a first device associated with the particular user of the authorized users of the electronic social networking environment, a summary of the one or more stored value accounts for display with a first user interface, where the transmitting causes one or more user-selectable options enabling selection of at least one of the stored value accounts for transfer;

processing, by the mobile wallet server of the server system, one or more transmissions from the first device that correspond to one or more selections of the one or more user-selectable options, and, responsive to the one or more transmissions, processing an identifier of a second user and generating a transfer notification of the transfer of a first value from the at least one of the stored value accounts, the generating the transfer notification comprising retrieving provisioning details stored by the server system and associated with the second user, and, based at least in part on the provisioning details, forming the transfer notification to transmit to a mobile device associated with the second user;

pushing, by the mobile wallet server of the server system, the transfer notification over a wireless communication channel to the mobile device associated with the second user when the mobile device is not online with the server system, the transfer notification causing activation of an application installed on the mobile device to activate on the mobile device a prompt regarding the transfer, the prompt comprising a user-selectable option to facilitate network-based communication between the mobile device and the server system when the mobile device comes online;

transmitting a second unique account identifier to the mobile device for use as a payment device;

receiving, by the server system, a transaction approval request from a payment processing computer system, the transaction approval request requesting approval of a transaction being attempted at a merchant outside the social networking environment, the transaction using value from a second stored value account associated with the second user and selected for redemption;

comparing, by the server system, a value of the transaction with the amount of value in the second stored value account selected for redemption; and transmitting, by the server system to the payment processing computer system, an approval or denial of the transaction.

17. The method of claim 16, wherein the transmitting the second unique account identifier to the mobile device comprises transmitting the second unique account identifier to a cellular telephone.

18. The method of claim 16, wherein the transmitting the second unique account identifier to the mobile device comprises transmitting the second unique account identifier to facilitate storing the second unique account identifier to a portable storage medium.

19. The method of claim 16, wherein the transmitting the second unique account identifier to the mobile device comprises transmitting the second unique account identifier to facilitate storing the second unique account identifier to a flash memory card.

20. The method of claim 16, wherein the transmitting the second unique account identifier to the mobile device comprises transmitting the second unique account identifier to facilitate storing the second unique account identifier to an electronic wallet on the mobile device.

21. The method of claim 16, further comprising:
reducing a balance of the second stored value account identified by the second unique account identifier stored on the mobile device by an amount of stored value redeemed in the transaction.

22. A host computer system, comprising:
server system comprising one or more servers and memory, the memory holding instructions that when executed by the server system cause the server system to:
operate an electronic social networking environment that provides each of its authorized users with access via a mobile application installed on a mobile devices respectively associated with the authorized users, process, by a first server of the one or more servers, information received by the server system over an electronic network, the information entered by the authorized users via one or more user interfaces facilitated by the server system, and provide, via the one or more user interfaces, control to the authorized users over how widely personal information entered by the authorized users is shared with other users, and facilitates electronic communication between the mobile devices and/or other computing devices associated with the authorized users of the electronic social networking environment;

associate, in one or more databases hosted by the server system, each of one or more stored value accounts with one or more unique account identifiers, one unique account identifier for each stored value account, each stored value account having a balance, such that the one or more stored value accounts are administered by an operator of the electronic social networking environment;

associate, in the one or more databases, the one or more account identifiers with a particular user of the authorized users of the electronic social networking environment;

transmit by a mobile wallet server of the one or more servers over the electronic network, from the server system to a first device associated with the particular user of the authorized users of the electronic social networking environment, a summary of the one or more stored value accounts for display with a first user interface, where the transmitting causes one or more user-selectable options, enabling selection of at least one of the stored value accounts for transfer;

process, by the mobile wallet server of the server system, one or more transmissions from the first device that correspond to one or more selections of the one or more user-selectable options, and, responsive to the one or more transmissions, processing an identifier of a second user and generating a transfer notification of the transfer of a first value from the at least one of the stored value accounts, the generating the transfer notification comprising retrieving provisioning details stored by the server system and associated with the second user, and, based at least in part on the provisioning details, forming the transfer notification to transmit to a mobile device associated with the second user;

push, by the mobile wallet server of the server system, the transfer notification over a wireless communication channel to the mobile device associated with the second user when the mobile device is not online with the server system, the transfer notification causing activation of an application installed on the mobile device to activate on the mobile device a prompt regarding the transfer, the prompt comprising a user-selectable option to facilitate network-based communication between the mobile device and the server system when the mobile device comes online;

enable storing of a second unique account identifier to the mobile device for use as a payment device;

receive a transaction approval request from a payment processing computer system, the transaction approval request requesting approval of a transaction being attempted at a merchant outside the social networking environment, the transaction using value from a second stored value account associated with the second user and selected for redemption;

compare a value of the transaction with the amount of value in the second stored value account selected for redemption; and transmit, to the payment processing computer system, an approval or denial of the transaction.

23. The host computer system of claim 22, wherein the instructions further cause the server system to reduce a balance of the second stored value account identified by the second unique account identifier stored on the mobile device by an amount of stored value redeemed in the transaction.

24. The host computer system of claim 22, wherein the instructions further cause the server system to send a direction to transfer funds to a bank associated with the merchant in an amount that reflects an implicit exchange rate between the currency of the account selected for redemption and the value of an item purchased in the transaction.

* * * * *